United States Patent [19]
Kaihu et al.

[11] 3,779,839
[45] Dec. 18, 1973

[54] METHOD OF CONNECTING ALUMINUM OR ALUMINUM ALLOY MEMBERS
[75] Inventors: Masaharu Kaihu; Masumitu Soeda; Hirosi Nakamura, all of Shimonoseki, Japan
[73] Assignee: Kobe Steel, Ltd., Fukiai-ku, Kobe-City, Japan
[22] Filed: July 14, 1971
[21] Appl. No.: 162,626

[30] Foreign Application Priority Data
July 25, 1970  Japan................................ 45/65112

[52] U.S. Cl.......................... 156/3, 156/22, 29/488, 29/494
[51] Int. Cl. .......................... C23f 17/00, C23g 1/10
[58] Field of Search .................. 29/488, 494; 153/3; 156/22

[56] References Cited
UNITED STATES PATENTS
3,416,975   12/1968   Pollack et al...................... 148/6.20
2,907,104   10/1959   Brown et al. .......................... 29/488

OTHER PUBLICATIONS

Brazing Manual Amer. Welding Doc. Rheinholdt Pub. Co., cpw. 1963, p. 60 and p. 62.

Brazing manual Amer. Welding Atmospheres and p. 135, Precleaning and Rheinholdt Pub. Co. cpw. 1963, p. 136, Fluxes and Atmospheres and p. 135, Precleaningpand Surface Prep.

Primary Examiner—Jacob H. Steinberg
Attorney—Norman F. Oblon et al.

[57]  ABSTRACT

A method of joining aluminum and/or aluminum alloy members by brazing in vacuum or an inert gas which includes the step of etching the aluminum or aluminum alloy and/or aluminum alloy brazing solder The a bath of etching solution to interd; ffusion fluorine ion in advance of brazing.

2 Claims, No Drawings

METHOD OF CONNECTING ALUMINUM OR ALUMINUM ALLOY MEMBERS

BACKGROUND OF THE INVENTION

1. Field of Invention

This invention relates to a method of connecting aluminum or aluminum alloy members, and more particularly to a method of joining aluminum or aluminum alloy members by using an aluminum alloy solder which is characterized by a lower melting point than that of the members, in a vacuum or in an inert gas atmosphere.

2. Description of Prior Art

Brazing methods are broadly used for connecting heat exchanger materials, such as condensers, evaporators, heaters, or electric and communication parts made of aluminum. Although the materials and parts are difficult to connect by conventional means such as welding because of their generally complicated shapes, they can be readily connected by brazing techniques.

The term "aluminum brazing" refers to a method of connecting an aluminum member by heating the member and an aluminum alloy solder to the melting point of the solder. Usually the aluminum alloy solder, typically an aluminum-silicon alloy, is characterized by a slightly lower melting point than that of the member to be brazed.

There are generally three types of brazing techniques utilized by industry: torch brazing, furnace brazing and dip brazing. Each of these brazing techniques require the use of a flux containing an alkali metal salt halide as its main component, which functions to remove the oxide coating from the surface of aluminum member and the brazing solder to improve the wettability of the brazing solder, and to form a sufficient fillet. The flux, however, is extremely corrosive toward aluminum, and hence, it must be removed, usually by molten metal and acid pickling techniques, after brazing. Unfortunately, the flux can not consistently be completely removed from the assembled product, especially from those having complicated shapes, with the result that corrosion is often induced.

In an attempt to alleviate this problem, a method has recently been proposed whereby the brazing is accomplished in an inert gas atmosphere, or in a vacuum, without a flux. This method has not proven to be entirely successful, however, since although surface oxidation of the member and alloy solder is prevented during heating, it is difficult to remove the surface oxide already present, with the result that an unsatisfactory connection so obtained.

SUMMARY OF THE INVENTION

It is, therefore, an object of the present invention to provide a method of joining aluminum or aluminum alloy members whereby new oxidation is restrained, yet which provides sufficient fluidity of the members and aluminum alloy solder.

It is another object of the present invention to provide a method of joining aluminum or aluminum alloy members whereby etching is accomplished without promoting further corrosion.

It is a further object of the present invention to provide a method of joining aluminum or aluminum alloy members which provides a satisfactory connection therebetween.

It is still another object of the present invention to provide a method of joining aluminum or aluminum alloy members which assures the formation of a satisfactory fillet.

It is still another object of the present invention to provide a method of joining aluminum or aluminum alloy members which provides sufficient corrosion resistance.

It is still another object of the invention to provide a method of joining aluminum or aluminum alloy members which does not require cleaning after brazing.

These and other objects have now herein been provided by joining aluminum or aluminum alloy members by brazing in a vacuum or in an inert gas atmosphere whereby the aluminum or aluminum alloy and/or aluminum alloy brazing material is etched in an etching bath containing a fluorine ion prior to brazing.

DETAILED DESCRIPTION OF THE INVENTION

In the method of this invention the oxidation of the aluminum or aluminum alloy member to be joined is restrained and the fluidity of the aluminum alloy solder is improved, by etching the member and the solder in an acid or alkali solution containing a fluorine ion. Thereafter, the members are brazed by being heated to the melting point of the aluminum alloy solder in vacuum or in an inert gas atmopshere, such as an atmosphere of nitrogen, argon, or the like.

The etching bath used in this invention is a conventional bath containing an acid or an alkali having a corrosive action toward aluminum or aluminum alloy, except that the bath must additionally contain a fluorine ion. Good results are obtainable when the bath contains between 0.5 and 30%, by weight, of said fluorine ion, with respect to the bath. If the quantity of fluorine ion is less than 0.5%, the extent of etching will be insufficient, while if it exceeds 30%, the material to be joined will also be etched with the possibility that corrosion will continue to proceed even after the etching treatment.

When the etching bath is an acid bath, any of a wide variety of mineral or organic acids may be used, such as for example, hydrofluoric acid, sulfuric acid, hydrochloric acid, nitric acid, phosphoric acid, etc. or such organic acids as formic acid and oxalic acid.

When the etching bath is an alkali bath, such alkalis as caustic soda, sodium carbonate, sodium silicate, etc. may be used.

The quantity of the acid or alkali in the bath depends upon the nature of the composition or compound, used. For best results, however, the bath should contain between 1–30%, in weight of the acid or alkali.

The fluoride ion may be added in the form of sodium fluoride, sodium acid fluoride, ammonium fluoride or a metal fluoride which is dissolvable in the acids or alkalis. It is important to note, that the metal salt ion in some metal fluorides may sometimes precipitate onto the surface of the aluminum so that at times it is best to select a non-metal fluoride source to avoid this difficulty. The use of hydrofluoric acid is convenient since it can be directly added to the other acids when an acid bath is used.

When the aluminum member or aluminum alloy solder is subjected to this etching bath, it is theorized that a coating of a complex fluoride salt, containing $AlF_3$ or $AlF_2 \cdot H_2O$, etc. is formed on the surfaces. So far as the solder is concerned, this coating will act to improve the fluidity of the solder.

If a slight amount of a chloride such as NaCl, magnesium chloride, etc. is added to the bath with the fluoride, a very good fillet will be formed. It is therefore desirable to add a chloride in amounts of from 1–5%. If more than 5% is added, the synergistic effect will occur but corrosion holes are liable to be produced on the surface of aluminum alloy during etching. Below the 1% quantity, no synergistic benefits are found.

Following the etching treatment, the aluminum member and the aluminum alloy solder are washed in water so as to remove any acid or alkali adhered to the surfaces. They are then dried by being heated to 80° – 100°C. to remove any moisture retained thereon.

Since aluminum in general will be gradually oxidized on protracted exposure to air, it is preferable to braze the aluminum member with the solder within 6 hours after treatment.

If such rapid brazing treatment is not possible within the 6 hour time period, it is best to add a minor amount of chromic acid anhydride to the bath to retard oxidation. Quantities of chromic acid anhydride above 0.4 $F^-/CrO_3$ is suitable for this purpose. Below 0.4, i.e., a high density of $CrO_3$, the corrosion resisting effect will be improved due to the formation of a chromate coating, but such large amounts of $CrO_3$ will have a negative effect on brazing. An aluminum member treated in an etching bath containing $CrO_3$ will be only slowly oxidized in air, as compared with members treated in etching baths containing no $CrO_3$ and can be adequately brazed even after 24 hours exposure in clean air, containing no extremely corrosive components.

Heretofore, the normal degree of vacuum used in a vacuum brazing is above $10^{-2}$ mmHg, but as will be shown in the following examples, if they are etched in acid baths of four elements such as nitric acid, sodium fluoride phosphoric acid and chloric acid, an excellant fillet is formed even in a vacuum of $10^{-1}$ mmHg, and the level of oxidation will be sufficiently low that a very satisfactory connection can be made.

Any of the known aluminum alloy solders may be used in the methods of this invention. For instance, suitable solders include the Al-Si(5–15%) alloys, possibly containing minor amounts of Cu or Zn. The shape of solder will generally depend upon the shape of the assembling parts, and may be in the form of a wire, foil or a clad material.

Since any component, which might promote corrosion on the surface of the joined members is washed off prior to brazing, it is not necessary to subsequently clean the brazed parts. Moreover the brazed parts have superior corrosion resistance as compared with that obtained with conventional fluxes.

Having now generally described the invention, a better understanding can be obtained by reference to certain specific examples which are included herein for purposes of illustration only and are not intended to be limiting unless otherwise specified.

EXAMPLE 1

Corrugated heat exchanger fins (0.4mm in thickness, 5 mm of pitch and 20mm in height) formed of 1100 (Market class) pure aluminum was brazed onto the surfaces of an extruded rectangular pipe (1.0mm in thickness, 25mm in width and 5mm in height) formed of 6063 Al-Si-Mg alloy. The rectangular pipe, corrugated fins and solder material; 0.2mm in thickness containing an Al-Si 7.5% alloy, were etched in an acid bath, containing 10% of nitric acid, 5% of ammonium fluoride and 0.5% of hydrofluoric acid, at room temperature for 3 minutes. The etched surfaces were then cleaned in flowing water, and dried at 80°C. for 10 minutes. Solder material was then inserted between the rectangular pipe and the corrugated fins and the fins were fixed by fittings. The assembly was then inserted into a vacuum furnace ($10^{-2}$ mmHg), heated at 610°C. for 1 minute, and then brazed.

The solder material formed a satisfactory fillet in an extremely rigid connection.

Brazing was affected under similar conditions except that instead of a vacuum, a nitrogen atmosphere was used, a beautiful connection was obtained without any surface oxidation.

If the aluminum member and solder are merely immersed in a 5% solution of ammonium acid fluoride, dried without water cleaning so as to retain some amount of fluoride on the surface and then brazed as above, no fillet is formed and a poor connection results. Moreover, even if the density of the ammonium fluoride is increased to 20%, a successful connection can not be obtained.

EXAMPLE 2

The aluminum member and aluminum alloy solder, described in Example 1, were etched in a bath containing 15% sulfuric acid, 5% of sodium fluoride, 0.5% hydrofluoric acid and 2% magnesium chloride, at room temperature for 8 minutes. The pieces were then cleaned in water and dried. Thereafter, the member and the solder were assembled and were fixed by a jig. They were heated in a vacuum furnace of $10^{-1}$ mmHg, at 610°C. for 1 minute, and were then brazed with the result that a satisfactory connection was obtained.

EXAMPLE 3

When fluorine ion is present in the 20% NaF solution, the weight percent of fluorine ion can be calculated as follows;

$$F/NaF = 19/23 + 19 = 0.45$$

Therefore, weight percent of fluorine ion with respect to the solution is;

$$0.45 \times 20/100 \times 100 = 9\% \text{ by weight}$$

For another example, when fluorine ion is present in the 20% $NH_4F$ solution, weight percent of fluorine ion can be calculated as follows;

$$F/NH_4F = 19/14 + 4 + 19 = 0.51$$

Therefore, weight percent of fluorine ion with respect to the solution is;

$$0.51 \times 20/100 \times 100 = 10.2\% \text{ by weight.}$$

EXAMPLE 4

Corrugated heat exchanger fins (0.4mm thickness, 5mm of pitch and 20mm in height) formed of 1100 (Market class pure aluminum) and a clad plate (0.8mm in thickness and 10% clad rate) was brazed using a 3003 core and a 7.5% Si-Al alloy on one side surface. The pieces were etched in an etching solution containing 10% of nitric acid, 5% of ammonium fluoride and 1% of hydrofluoric acid, at room temperature for 8 minutes. They were cleaned with water and dried. The corrugated fins were then fixed to the clad side, inserted into a vacuum furnace ($10^{-2}$mmHg) and heated at 610°C. for one minute. An excellent fillet was formed at the connecting portion in rigid connection.

It will be readily understood from the foregoing description that according to the method of this invention, a rigid connection of aluminum or aluminum alloy member and/or aluminum alloy solder can be obtained without the use of a strongly corrosive flux, in conventional brazing operations; and, the joined parts formed by the method of this invention are superior in corrosion resistance.

Having now fully described the invention it will readily be apparent to one of ordinary skill in the art, that many changes and modifications can be made thereto without departing from the sprirt and scope of the invention.

What is claimed is:

1. In a method of joining aluminum members or aluminum alloy members by brazing in a vacuum or in an inert atmosphere without a flux, the improvement comprising, prior to brazing, the step of etching said member and/or an aluminum alloy solder material to be joined, in an etching bath containing 0.4 – 30 weight percent of a fluorine compound selected from the group consisting of alkali metal fluoride, sodium acid fluoride, ammonium fluoride, hydrofluoric acid, 1–5 weight percent of a chlorine compound selected from the group consisting of sodium chloride and magnesium chloride and $CrO_3$ in the ratio of $F^-/CrO_3$ of greater than 0.4.

2. The method according to claim 1 wherein after the member and/or solder are etched, they are water washed and heated to 80°–100°C so that any retained moisture is removed.

* * * * *